United States Patent
Baştuğ et al.

(10) Patent No.: US 8,385,398 B2
(45) Date of Patent: Feb. 26, 2013

(54) RECEIVER WITH CHIP-LEVEL EQUALISATION

(75) Inventors: Ahmet Baştuğ, Istanbul (TR); Stefania Sesia, Nice (FR)

(73) Assignee: ST-Ericsson SA, Geneva (CH)

(*) Notice: Subject to any disclaimer, the term of this patent is extended or adjusted under 35 U.S.C. 154(b) by 999 days.

(21) Appl. No.: 12/097,672

(22) PCT Filed: Dec. 12, 2006

(86) PCT No.: PCT/IB2006/054783
§ 371 (c)(1), (2), (4) Date: Oct. 29, 2008

(87) PCT Pub. No.: WO2007/072306
PCT Pub. Date: Jun. 28, 2007

(65) Prior Publication Data
US 2009/0225814 A1   Sep. 10, 2009

(30) Foreign Application Priority Data

Dec. 19, 2005 (EP) .................................. 05301071
Apr. 21, 2006 (EP) .................................. 06300391

(51) Int. Cl.
*H03K 5/159* (2006.01)
(52) U.S. Cl. ........................... 375/232; 375/147
(58) Field of Classification Search .............. 375/140, 375/147, 148, 229, 232–234
See application file for complete search history.

(56) References Cited

U.S. PATENT DOCUMENTS 5,539,774 A * 7/1996 Nobakht et al. .............. 375/232
6,658,047 B1  12/2003 Komulainen et al.
7,477,634 B1 * 1/2009 McKown ...................... 370/342
(Continued)

FOREIGN PATENT DOCUMENTS
EP    1530300 A1   5/2005

OTHER PUBLICATIONS

Margetts, A. R; et al "Adaptive Chip-Rate Equalization of Downlink Multirate Wideband CDMA" IEEE Transactions on Signal Processing, vol. 53, No. 6, Jun. 2005, pp. 2205-2215.

(Continued)

*Primary Examiner* — Shuwang Liu
*Assistant Examiner* — David Huang
(74) *Attorney, Agent, or Firm* — William J. Kubida; Peter J. Meza; Hogan Lovells US LLP

(57) ABSTRACT

The present invention relates to receiver apparatuses and methods of controlling weight adaptation in a receiver of a code multiplex telecommunications system with orthogonal spreading codes, wherein received discrete time signal samples are chip-level filtered by using a first equalizing step. Additionally, the received discrete time signal samples are delayed by a time period corresponding to a data symbol and used in a second equalizing step. Symbol estimates obtained from the first equalizing step are non-linearly filtered and used as a desired response for the second equalizing step in the following symbol period, wherein equalizer weights adapted in the second equalizing step are used for the first equalizing step. Alternatively, the second equalizing step may be dispensed with and weight adaptation may be incorporated in a single equalizing step. As an additional or alternative option, a hybrid equalizer architecture may be provided, where the above two-step equalization is used during an active phase where a channel is allocated, while another weight updating scheme is used during an inactive phase where no channel is assigned. Thereby, detrimental effects of interference power can be reduced at low increase in complexity.

14 Claims, 5 Drawing Sheets

U.S. PATENT DOCUMENTS

| | | | |
|---|---|---|---|
| 2002/0034191 A1* | 3/2002 | Shattil | 370/464 |
| 2002/0085623 A1 | 7/2002 | Madkour et al. | |
| 2004/0076224 A1* | 4/2004 | Onggosanusi et al. | 375/144 |
| 2005/0100052 A1 | 5/2005 | Mailaender et al. | |

OTHER PUBLICATIONS

Madkour, Mohamed F; et al "Successive Interference Cancellation Algorithms for Downlink W-CDMA Communications" IEEE Transactions on Wireless Communications, vol. 1, No. 1, Jan. 2002, pp. 169-177.

Mailaender, L; et al Institue of Electrical and Electronics Engineers "Linear-Aided Decision-Feedback Equalization for the CDMA Downlink" Conference Record of the 37th Asilomar Conference on Signals, Systems, & Computers, vol. 1 of 2, Conference 37, Nov. 9, 2003, pp. 131-135.

* cited by examiner

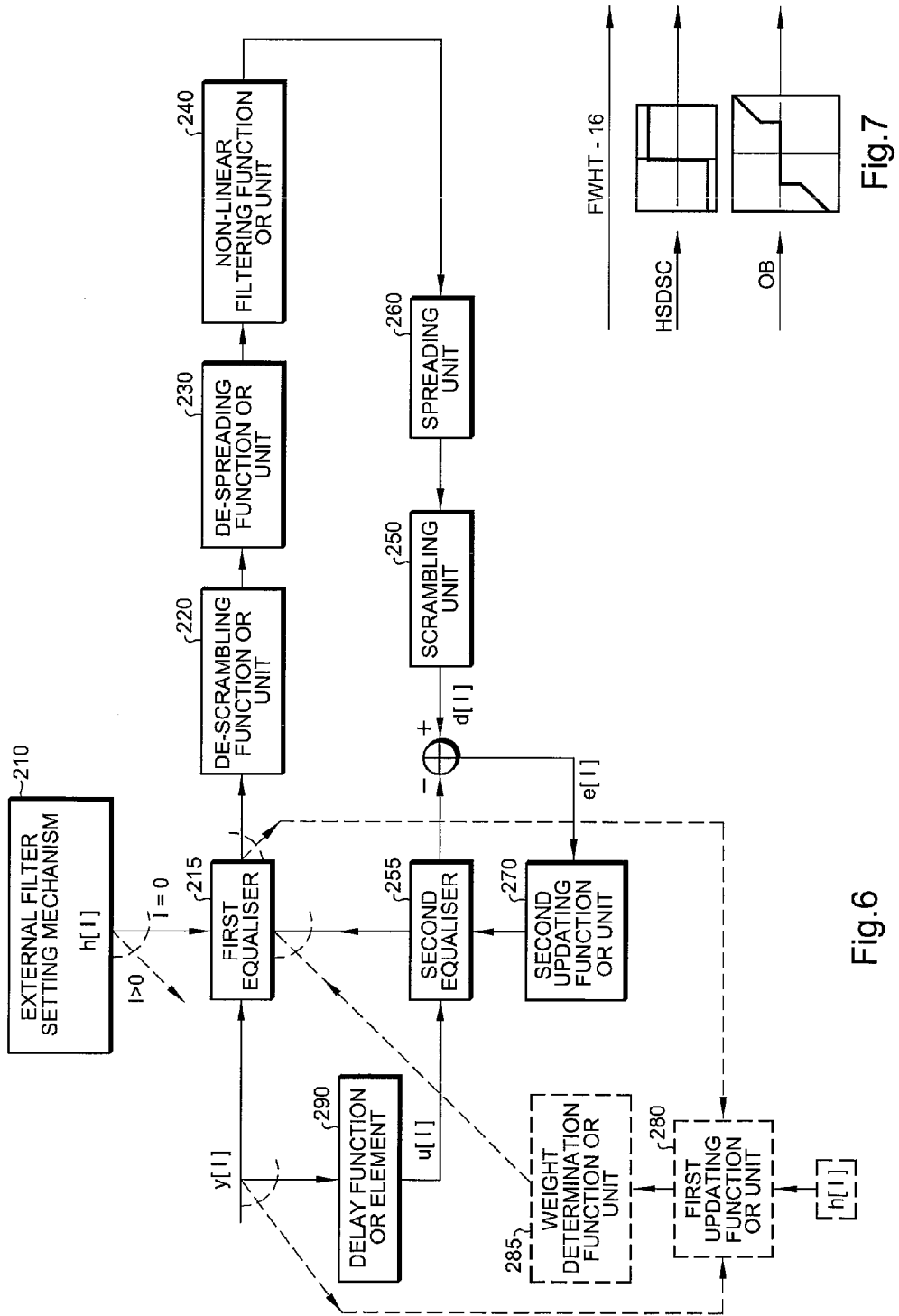

US 8,385,398 B2

RECEIVER WITH CHIP-LEVEL EQUALISATION

FIELD OF THE INVENTION

The present invention relates to a receiver apparatus and method of controlling weight adaptation in a receiver of a code multiplex telecommunications system with orthogonal spreading codes. As an example, the present invention relates to a receiver apparatus and weight adaptation method for a High Speed Downlink Packet Data Access (HSDPA) system as introduced in the Universal Mobile Telecommunications System (UMTS) Release-5 standard.

BACKGROUND OF THE INVENTION

Code Division Multiple Access (CDMA) systems are based on a digital wideband spread spectrum technology in which multiple independent user signals are transmitted across an allocated segment of the available radio spectrum. In CDMA, each user signal comprises a different orthogonal code and a pseudo random binary sequence that modulates a carrier, thereby spreading the spectrum of the waveform and thus allowing a large number of user signals to share the same frequency spectrum. The user signals are separated in the receiver with a correlator which allows only the signal with the selected orthogonal code to be de-spread. Other user signals whose codes do not match are not de-spread and as such contribute to system noise. The signal-to-noise ratio (SNR) of the system is determined by the ratio of the desired signal power to the sum of all interfering signals, enhanced by the system processing gain and the ratio of the spread bandwidth to the baseband data rate. In 3rd generation Wideband CDMA (WCDMA) different spreading factors and variable user data rates can be supported simultaneously.

By the use of spreading codes, the frequency band of a transmission signal is spread to a chip rate, which is larger than the actual data or information symbol rate. For example, if the used spreading code has the length of eight data symbols (referred to as "chips"), eight chips are transmitted for every data symbol. The property of unique codes is given by the property of orthogonality of the spreading codes meaning in mathematical terms that the inner product or correlation respectively of the spreading codes used or to use for communication is zero. Orthogonality of the spreading codes guarantees that transmission of a signal or sequence of data symbols respectively which is coded by a spreading code neither creates or propagates side effects to other signals coded by other orthogonal spreading codes and corresponding to other users of a communication system. A receiver looking for a certain spreading code of a certain transmitter will take signals coded by orthogonal spreading codes as a noise of the radio frequency (RF) channel. Since spreading codes can have different length, the property of orthogonality must be given also for spreading codes of different lengths.

Construction of a spreading code can be achieved by use of an orthogonal variable spreading factor (OVSF) tree as shown in FIG. 2, wherein the abbreviation "SF" designates the spreading factor characterizing the length of the spreading code and the level of the OVSF tree. Within each tree level, the available spreading codes have the same length and are orthogonal. The spreading factor may also be expressed by at the ratio between chip rate and data symbol rate or between chip duration and data symbol duration. Spreading codes of different users may fall into different levels in an OVSF tree thus providing various levels of quality of service (QoS). User symbols may be spread by spreading factors ranging from 4 to 512.

In CDMA systems in general, however, due to multipath propagation and frequency-selective fading, orthogonality between the various users waveforms is degraded and multiple access interference impairs the performance of the receiver. Although the transmitted user signals at the base station (BS) side are orthogonal, this orthogonality may no longer exist at a mobile station (MS) front-end due to multipath effects of the propagation channel between the transmitter and the receiver, which are caused by the fact that the channel may consist of more than one distinct propagation path for each signal of a user. Thus, multipath is a propagation phenomenon resulting in radio signals reaching the receiving antenna by two or more paths, so that the radio signals arrive at the receiver with different time delays. Causes of multipath propagation include atmospheric ducting, ionospheric reflection and refraction, and reflection from terrestrial objects, such as mountains and buildings.

FIG. 3 shows a typical CDMA communication system which comprises a plurality of mobile or user stations $MS_1, \ldots, MS_K$ and enables a plurality of users $(1, \ldots, K)$ to communicate with a base station $BS_1$. Each of both the base station $BS_1$ and mobile stations $MS_1, \ldots, MS_K$ comprise a transmitter $TBS_1$, $T_{MS_1}, \ldots, T_{MS_K}$ and a receiver $R_{BS_1}$, $R_{MS_1}, \ldots, R_{MS_K}$. The transmitter $T_{BS_1}$ of the base station BS transmits data in a downlink or forward link respectively to each of the user stations $MS_1, \ldots, MS_K$ and a receiver $R_{BS_1}$ of the base station $BS_1$ receives data in an uplink or a reverse link respectively from each of the mobile user stations $MS_1, \ldots, MS_K$. The air space between the base station $BS_1$ and the mobile user stations $MS_1, \ldots, MS_K$ usually provides a multipath environment for both the uplink and the downlink communications represented as arrows in FIG. 3.

The following three common approaches have been used to circumvent the problem of loss of orthogonality or interference, respectively:

The first and most straight forward approach is to treat the generated interference due to multipath propagation as an additive white Gaussian noise (AWGN) and implement the conventional Rake receiver to detect symbols of a user independently from others by collecting the energy from a number of delayed forms of the received signal via correlations with the spreading code of that particular user.

The second approach is interference suppression, which partially brings back orthogonality via usage of chip rate channel equalisers and again estimates the symbols of a particular user independently from others via correlation with its spreading code.

Finally, the third approach is interference cancellation (IC). Firstly, the symbols of known active interfering spreading codes are estimated via methods in compassing one of the first two approaches. Then, the estimated symbols are respread, re-channeled and deleted from the originally received signals.

As already mentioned above, orthogonality may no longer exist at a MS front-end due to the multipath effect of the propagation channel between the transmitter and the receiver. This loss of orthogonality may cause inter-code interference (also known as multi-user interference or multi-access interference), inter-chip interference and inter-symbol interference in the symbol estimates. Receivers that are within the optimal or close-to-optimal category, i.e. multi-user detectors (MUDs) and interference cancellers (ICs), most of the time require knowledge about the signal and the channel parameters of all active users so as to mitigate the multipath effect and detect the desired data stream in most reliable ways. However, the possibility to implement MUDs or ICs in mobile stations is limited due to their high complexity and due to the fact that transmission parameters of all users are usually not known. A very practical and highly utilized suboptimal solution is the conventional Rake receiver according to the above first approach, which performs a matched filter operation on the code of the desired user, such that multi-user interference is considered as an additional white noise.

However, when small spreading factors are used to achieve high data rates like, for example, in HSDPA systems, performance of the Rake receiver decreases due to the fact that the multipath interference becomes significant and the correlation characteristics of the spreading sequences are destroyed. For these reasons, equalisers according to the above second approach are considered for systems with small spreading factors in order to restore orthogonality between the users and limit interference, allowing to achieve higher data rates. This is particularly important for systems like HSDPA where the goal is to provide very high data rates.

In the UMTS standard, four QoS classes are defined with different delay and ordering needs. The four classes are conversational class with low delay and strict ordering (e.g. voice), streaming class with modest delay and strict ordering (e.g. video), interactive class with modest delay and modest ordering (e.g. web browsing), and background class with no delay guarantee and no ordering (e.g. bulk data transfer). Among these service classes, background class and interactive class have a bursty nature. This burstiness triggered the idea of users' time sharing of some of the resources, most importantly the orthogonal codes in the downlink, along with other supporting techniques, extensions, changes, removals applied on these channels. Hence, HSDPA has emerged as a system that would increase downlink data throughput by using fast physical layer retransmission and transmission combining and link adaptation controlled by the BS (or Node B in UMTS terminology). In HSDPA, two of the main features of WCDMA are disabled, namely variable spreading factor and fast power control. They are replaced by adaptive coding rate and adaptive modulation and extensive multi-code operations. The spreading factor is fixed to SF=16. A user can use up to 15 codes simultaneously, which enables a large dynamic range of HSDPA link adaptation and maintains good spectral efficiency. The scheduling process is done in the Node B so that it has the possibility of allocating or capacity to one user if necessary, and if the channel conditions make this strategy efficient.

To support the new HSDPA functionalities, two additional type of channels have been introduced. In the downlink direction from the BS or Node B to the MS, one or more shared control channels (HS-SCCHs) broadcast HSDPA channel assigned identities, transport format and hybrid automatic repeat request (HARQ) process identifier. In the uplink direction, a high speed dedicated physical control channel (HS-DPCCH) carries status reports for HARQ and channel quality indicators (CQIs).

The concept of equalisation based on the above second approach has been applied in different systems for several years. Consequently several equaliser schemes exist.

As an example, the U.S. Pat. No. 6,658,047 discloses an adaptive channel equaliser used in a receiver of a CDMA telecommunications system. An estimator for estimating an impulse response of a channel provides a reference for the adaptive equaliser, and the adaptive equaliser operates to estimate a transmitted chip sequence of the channel and restore orthogonality among the received signals. The adaptive equaliser includes circuitry for utilizing a blind adaptive algorithm, called Griffith algorithm, to estimate the transmitted chip sequence of the channel.

Additionally, Schniter P. et al., "Adaptive Chip-Rate Equalisation of Downlink Multirate Wideband CDMA", IEEE Transactions on Signal Processing, Volume 53, Issue 6, June 2005, pp. 2205-2215, discloses a decision-directed (DD) chip-rate adaptive equalisation scheme aided by filtering and/or cancellation of multi-access interference (MAI). In the acquisition mode, a code-multiplexed pilot is used to adapt the equaliser from code start or loss-of-lock. The use of MAI filtering results in a 3rd-order least mean square (LMS) algorithm, which has significant advantages over a standard (i.e., 1st-order) LMS in non-stationary environments. In the tracking mode, decision-direction facilitates MAI-cancellation in the equaliser update, which enhances performance.

FIG. 4 shows a schematic block diagram of the DD chip-rate adaptive equalisation as described in the above prior art. In the DD mode, the receiver makes hard tentative decisions on all active users' symbols and uses them to construct a delayed, approximate copy of the transmitted sequence. The transmitted sequence is then used to update an adaptive filter at chip rate. Since it will not be possible to make reliable symbol estimates without a properly adjusted equaliser, the DD mode is only engaged after a preceding pilot-trained mode has converged. According to FIG. 4, the symbol estimation procedure comprises de-scrambling of the output of a tentative equaliser $\hat{f}^H(i)$ by multiplication with a de-scrambling signal $s^*(i-v)$. Then, a matched-filter output is computed for each active user in a de-spreading unit 4 and the matched-filter outputs are quantized in a detection unit 6. The hard symbol estimates and spreading codes are then used to regenerate a delayed, approximate copy of the multi-user sequence by re-spreading in a re-spreading unit 8 and multiplication by a re-scrambling signal $s(i-N_{max}-v)$. The re-scrambling operation yields a signal $\hat{t}(i-N_{max}-v)$. This re-scrambled signal is subtracted from the output of a second equaliser $f^H(i)$ to which a delayed input signal, which has been delayed by a delay of $N_{max}$ chips is supplied, wherein $N_{max}$ denotes the spreading gain of the lowest-rate user. Hence, two equaliser functions are provided, namely an $N_{max}$-delayed equaliser function $f(i-N_{max})$ which is adaptively updated and a tentative equaliser function $\hat{f}(i)$ which is used to generate the symbol estimates. The tentative equalising function $\hat{f}(i)$ can be computed in a prediction unit 2 using an $N_{max}$-step forward prediction of the delayed equalising function $f(i-N_{max})$. The adaptation of the delayed equaliser is performed based on a subtraction of the re-scrambled output $\hat{t}(i-N_{max}-v)$ from the output $x(i-N_{max})$ of the delayed equaliser.

Under the HSDPA system, there are two possible phases during which the MS or user equipment (UE) in UMTS terminology can track (estimate) and/or equalize the channel, namely inactive and active phases. The inactive phase (or state) is when the user is listening to a channel but no high speed downlink shared channel (HSDSCH) has been assigned to him, while the active phase is given when at least one HSDSCH code has been assigned to him. The above adaptive equaliser described by Schniter et al. does not provide an optimal solution for high speed channels as provided in the HSDPA system. Due to the large delay introduced in the adaptation branch of the delayed equaliser, the adapted filter weights or taps cannot be directly used at the upper branch filtering operation of the tentative equaliser. In very fast changing channels, the prediction mechanism of the prediction unit 2 is essential to guess the upper branch filter weights of the tentative equaliser from the lower branch filter weights of the adaptive equaliser. Moreover, a substantial delay which corresponds to the maximum active spreading factor in the system is introduced and can even be 512 chips in some cases.

Additionally, in the adaptive equaliser scheme proposed by Schniter et al., knowledge of all active codes in the system is assumed. It is thus required to detect where the active codes reside in the OVSF hierarchy and estimate their amplitudes. This is however a very complicated process and hence not easy to implement. Even when implemented, problems of false detection, missing detection and wrongly estimated amplitudes may still occur. Moreover, de-spreading is done with each active code independently at various levels in the OVSF trees, which leads to a high computational complexity.

SUMMARY OF THE INVENTION

It is therefore an object of the present invention to provide an improved receiver end weight adaptation control method, by means of which defects of interference power can be reduced while complexity increase can be kept small. According to a first aspect, this object is achieved by a receiver apparatus and a weight adaptation control method respectively. According to an embodiment, the receiver apparatus comprises a filtering branch with first equaliser means for receiving discrete time signal samples and for chip-level filtering said received signal samples; feedback means for non-linear filtering symbol estimates obtained in said filtering branch and feeding the filtered symbol estimates back to the first equaliser means; adaptation means for receiving said received signal samples via a delay means arranged for delaying said received signal samples by a time period corresponding to a data symbol, wherein said filtered symbol estimates are used by the adaptation means as desired response for adapting equaliser weights of the first equaliser means in the following symbol period. According to an embodiment, the weight adaptation control method comprises receiving discrete time signal samples and chip-level filtering said received signal samples by using a first equalising step; delaying said received discrete time signal samples by a time period corresponding to a data symbol and using said delayed time signal samples in an adaptation function for said first equalising step; and applying a non-linear filtering operation to symbol estimates obtained from said first equalising step and using the filtered symbol estimates as a desired response for said adaptation function for adapting equaliser weights for said first equalizing step in the following symbol period.

Accordingly, the delay introduced in the adaptation branch is fixed and reduced to only one symbol period of 16 chips. Therefore, filter weights can be copied from the equaliser of the adaptation branch to the equaliser of the filtering branch without requiring any prediction. Moreover, the non-linear filtering of the symbol estimates can be based on knowledge of the specific channel codes, so that a more robust method and system can be achieved.

Additionally, in the solution wherein the first equaliser means comprises the adaptation means, only one equalising function or unit is necessary, which leads to a considerable reduction of complexity, overhead, and power consumption.

According to an additional or alternative second aspect, the 20 above object is achieved by a receiver apparatus and by a weight adaptation control method. According to an embodiment, the receiver apparatus comprises a filtering branch for receiving discrete time signal samples and for chip-level filtering said received signal samples; equaliser means for restoring orthogonality between spreading codes included in said received signal samples; weight adaptation means for updating filter weights of said equaliser means; and selection means for controlling said weight adaptation means to use a first updating scheme for weight adaptation during an active phase in which at least one channel code is assigned to said receiver apparatus, and to use a second updating scheme for weight adaptation during an inactive phase in which no channel code is assigned to said receiver apparatus. According to an embodiment, the weight adaptation control method comprises receiving discrete time signal samples and chip-level filtering said received signal samples; equalising said received signal samples to restore orthogonality between spreading codes included in said received single samples; and controlling updating of filter weights applied in said equalising step, so as to use a first weight updating scheme during an active phase in which at least one channel code is assigned to said receiver apparatus, and so as to use a second weight updating scheme during an inactive phase in which no channel code is assigned to said receiver apparatus.

Accordingly, a hybrid equaliser architecture is proposed, with a selective weight adaptation scheme, in which updating algorithms are selected based on the phase of the telecommunications system, i.e. active phase and inactive phase. Thereby, filter weights or taps can be expected to be more reliable at the beginning of the active phase in order to decrease computations load and complexity. The updating rate for the second updating scheme used during the inactive phase can be selected to a lower value than the update rate used during the active phase. The second weight updating scheme merely has to be selected in a manner not to loose the tracking capability of the channel.

In the specific example of a HSDPA system, the time period may correspond to the fixed symbol length of 16 chips of the orthogonal spreading codes. Thus, a short delay of only 16 chips is introduced, so that the weights updated in the adaptation branch can immediately be used for the first equaliser means in the filtering branch.

The filtering branch may comprise de-spreading means for de-spreading de-scrambled and equalized signal samples by applying a Fast Walsh Hadamard Transformation (FWHT) at a single code tree level, wherein de-spread signal samples are supplied to the feedback means. Using the fixed-level FWHT provides the advantage of a decreased de-spreading complexity. In the example of a fixed symbol length of 16 chips, the de-spreading complexity can be decreased by a factor of 4. The filtered symbol estimates fed back by the feedback means may be re-spread again in a spreading means using FWHT.

Furthermore, subtracting means may be provided for obtaining a difference between equalized signal samples output from the second equaliser means and feedback signal samples obtained from the feedback means, and for supplying the difference to updating means for adapting the equaliser weights of the second equaliser means. Thereby, the estimated chip level signal can be used as a kind of training sequence or desired signal for the second equaliser means residing in the adaptation branch. In the single equaliser alternative, the subtracting means may be arranged for obtaining a difference between filtered signal samples, output from the equaliser means and delayed via another delay means arranged for delaying the filtered signal samples by a time period corresponding to a data symbol, and feedback signal samples obtained from the feedback means, and for supplying the difference to updating means for adapting the equaliser weights of the equaliser means.

Additionally, selecting means may be provided for selecting the second equaliser means during an active phase in which at least one channel code is assigned to the receiver apparatus, and for selecting other weight updating means during an inactive phase in which no channel code is signed to the receiver apparatus. This hybrid equaliser architecture provides the advantage that different update mechanisms and supporting desired signals or statistics are used during inactive and active phases of a channel, to thereby decrease computational load. In particular, the other weight updating means may be arranged to operate based on a direct comparison of an input and output of the first equaliser means. As a specific but not limiting example, the other weight updating means may be arranged to operate based on the Griffith algorithm.

As a further option, the feedback means may be arranged to categorize the symbol estimates obtained in the filtering branch into a first branch group of downlink shared channels supposed to carry most reliable estimates which are to be hard-detected, a second branch group of first outputs to be excluded from feedback and to be replaced by a known constant sequence, or to be fed back scaled by linear minimum mean square error (LMMSE) weighting, and a third group of remaining branches again fed back scaled by LMMSE weighting. If the estimated LMMSE weight on any particular branch is negative, then it is replaced by zero. This very last situation is equivalent to blocking those branches from feedback and it occurs when the power at that particular branch is below a predetermined threshold $\sigma_{th}^2$. This hybrid mechanism provides the advantage that only the knowledge of specific downlink shared channels is explicitly used, so that robustness of the system can be improved. In particular, the predetermined threshold applied to the third branch group may correspond to an average energy level between the hard-detected and soft-detected values of the all downlink shared channels. This averaging among the codes of the downlink shared channels decreases estimation error variance.

LMMSE weighting is a measure of a signal-to-interference-plus-noise (SINR) ratio. By this measure, a mixture of hard and weighted linear decisions is provided with explicit reliability measures.

The LMMSE weighting on the remaining code branches can be computed in the following way. Assuming the instantaneous power on any branch k is $|\hat{s}_k|^2$ and the predetermined threshold is as defined before $\sigma_{th}^2$. Then, the LMMSE weight on that branch will be $$c_k = \frac{|\hat{s}_k|^2 - \sigma_{th}^2}{|\hat{s}_k|^2}.$$

The numerator term in the weight corresponds to useful signal power and the denominator term corresponds to the sum of useful power and noise-plus-interference power.

The multiplexing mechanism between the hard pilot addition and scaled linear feedback of the first branch requires a threshold value. If the pilot tone power is $P_{CPICH}$, then the calculated optimal threshold value is $P_{thr} = P_{CPICH} + 2*\sigma_{th}^2$. If the power on the first branch is smaller than $P_{thr}$, then the pilot signal is added to the feedback path in a hard manner. Otherwise the first branch output is feedback by LMMSE scaling, as is done for the other remaining branches.

Further advantageous developments are defined in the dependent claims.

BRIEF DESCRIPTION OF THE DRAWINGS

The present invention will now be described based on preferred embodiments with reference to the accompanying drawings in which:

FIG. 6 shows a block diagram of an equaliser architecture according to a first preferred embodiment;

FIG. 7 shows diagrams relating to a selective non-linear filtering operation in the preferred embodiments.

DESCRIPTION OF THE PREFERRED EMBODIMENTS

In the following, the preferred embodiments will be described based on a HSDPA data access system according to the Release-5 specification of the UMTS standard. HSDPA has been developed to provide high data rates in the downlink direction. Due to this feature and due to the dispersive nature of the HSDPA channel, the conventional Rake receiver according to the above mentioned first approach is not considered anymore, and an equaliser scheme according to the above second approach is recognized as the key solution.

Figure 1:
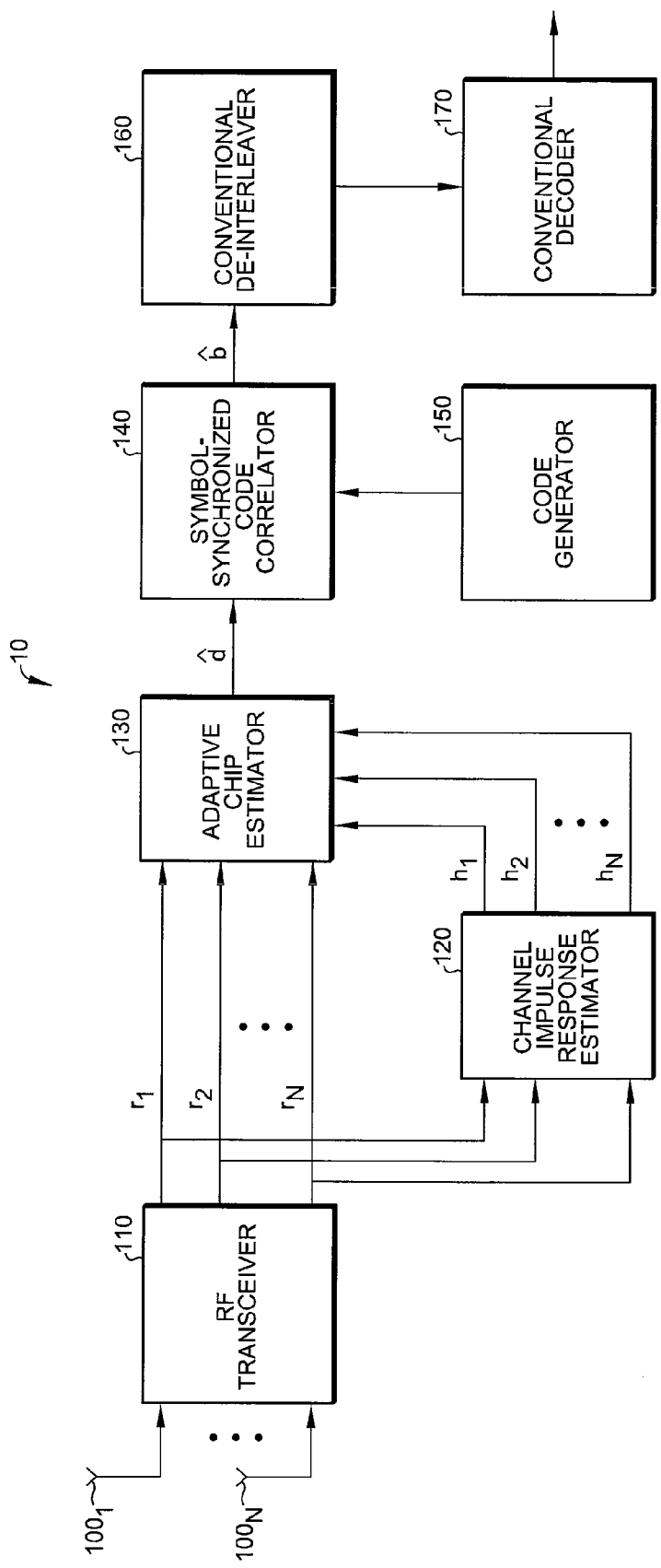
FIG. 1 shows a schematic block diagram of a receiver architecture in which the present invention can be implemented.

FIG. 1 shows a schematic block diagram of a receiver 10 in which the preferred embodiments of the present invention can be implemented. The receiver 10 has an adaptive interference suppression algorithm, which is based on channel equalisation and suitable for synchronous CDMA systems using orthogonal spreading codes with code scrambling. In particular, the receiver 10 is not obliged to have any training sequence or training information for the adaptation of the equalisation. It only needs initialization weights, which might or might not need a channel estimation scheme that requires a training sequence.

According to FIG. 1, at least one antenna $100_1$ to $100_N$ receives signals from a telecommunications channel. The signals are coupled to a conventional RF transceiver 110 including an analog-to-digital (A/D) converter. The conventional RF transceiver 110 may optionally perform chip wave form filtering. The converted signals $r_1$ to $r_N$ are forwarded to a channel impulse response estimator 120 and to an adaptive chip estimator 130. The channel impulse response estimator 120 operates to estimate the impulse response of the channel and provides reference input factors or weights $h_1$ to $h_N$ to the adaptive chip estimator 130 in order to provide initialization weights. The output of the adaptive chip estimator 130 is coupled to a symbol-synchronized code correlator 140. The correlator 140 de-spreads the output d of the adaptive chip estimator 130 by multiplying it with the output of a code generator 150, and then integrating over the symbol period. The code generator 150 is capable of generating a required spreading code according to the above OVSF tree of FIG. 2. The output of the correlator 140 is coupled to a conventional de-interleaver 160 which intern is coupled to a conventional decoder 170 which outputs data decisions.

The proposed equaliser function achieved by the channel impulse response estimator 120 and the adaptive chip estimator 130 serves to suppress multiple access interference by striving to restore orthogonality of the users waveforms at the receiver by estimating the transmitted multi-user chips and thus equalising the channel. With a perfectly estimated chip sequence, the desired users signal can be restored without any residual interference from the other users by correlating the multi-user chip sequence with the scrambling code and spreading code of the user.

A problem of the adaptive approach for CDMA based UMTS systems is that no reliable training multi-user chip sequence is available. Nevertheless, the need for the training sequence is avoided by using knowledge of the correlation between the desired signal (multi-user chip sequence) and the received signal. To achieve this, the receiver 10 employs the channel impulse response estimator 120 to estimate the channel impulse response.

According to the preferred embodiments, a hybrid equaliser architecture is proposed, which is based on variants of the chip level LMS algorithm. The rule of equaliser weights updating may be either the Griffith algorithm in the inactive period of the HSDPA channel or a novel decision directed based scheme during the active period, which exploits all available power by exploiting partial code knowledge of HSDPA codes. Thereby, updating of filter taps or weights can be done at a rate lower than the chip rate providing important savings in complexity. The preferred embodiments provide remarkable gains compared to conventional Rake receiver based solutions.

In the present example of a HSDPA system, two possible phases are provided, during which a terminal device, such as mobile terminal or user equipment (UE) in 3rd generation terms, can track or estimate and/or equalize the channel. These two phases are called inactive phase and active phase. The inactive phase or state is given when the user is listening to the channel but no high speed downlink shared channel (HSDSCH) code has been assigned to him. On the other hand, the active phase or state is given when at least one HSDSCH code has been assigned to him. During inactive and active phases similar adaptive equaliser architectures may be used, but the update mechanisms and the supporting desired signals or statistics are different.

Figure 5:
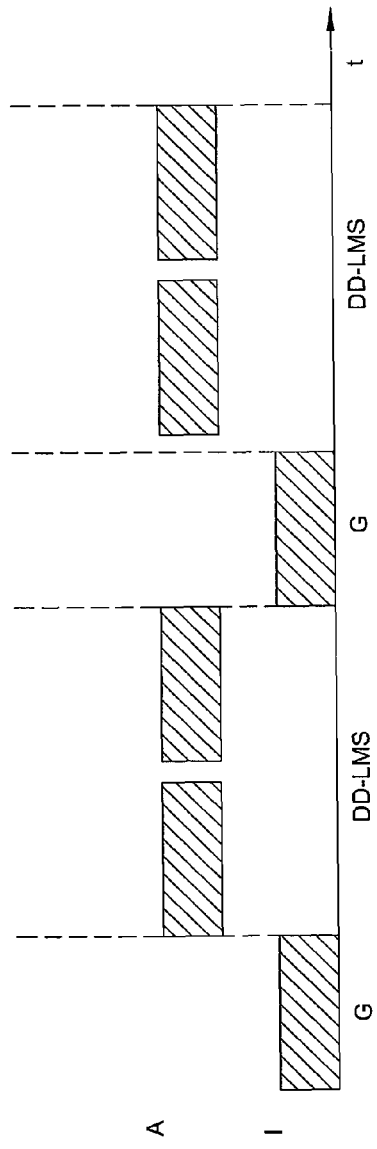
FIG. 5 shows a time diagram indicating inactive and active phases with corresponding updating algorithms according to the preferred embodiments.

FIG. 5 shows a schematic time diagram indicating inactive phases I and active phases A and corresponding update mechanisms for updating equaliser weights. The update mechanisms are selected to optimize equaliser operation in terms of computational load, estimation speed, interference suppression and the like. During the inactive phase I, the update mechanism shall simply serve not to lose tracking capability of the time-varying channel. To this end, the known Griffith algorithm G, which in general is used when a training sequence (desired signal) is not available or is not reliable. The Griffith algorithm G used during the inactive periods I approximates the input/output cross correlation part of Wiener filtering by exploiting the variance of the total signal of the base station and channel estimate. This provides the advantage that filter taps at the beginning of the active phase A can be expected to be more reliable than simply considering a Rake receiver as the temporary initialization solution at those switching instants. In order to decrease computational load, the update rate for the Griffith algorithm G can be considered less than the update rate chosen during active phases A. However, it is noted here that a symbol-level LMS mechanism using the pilot tone could be used as well during the inactive phase I, wherein filter taps or weights are updated at most once every 256 chips.

On the other hand, during the active phase A when at least one HSDSCH is assigned to the user, new update mechanisms are proposed based on new variants of the decision directed least mean squared error (DD-LMS) equaliser.

FIG. 6 shows a schematic block diagram of a proposed hybrid equaliser architecture according to the first preferred embodiment with a new variant of the DD-LMS equaliser.

The dashed lines and boxes in FIG. 6 represent the parts of the equaliser architecture which operate during inactive periods, i.e. when the Griffith algorithm is used for weight updating. A first updating function or unit 280 controls a weight determination function or unit 285 to apply filter weights to a first equaliser 215 in a filtering branch of the equaliser architecture. The update rule of the first updating unit 280 is given in the below equation (1) and implements a recursive filter update procedure according to the Griffith algorithm, where $w_{Rake}$ designates the finite impulse response (FIR) form of the conventional Rake receiver with as many taps as the channel length. This FIR form of the Rake receiver is known as channel matched filter (CMF). It corresponds to the conjugate symmetry of the channel, i.e. $w_{Rake}[n]=h^*[-n]$, wherein $h[n]$ represents the channel tap with delay n. $\sigma^2_d$ designates the total base station signal variance, $w_l$ designates the present state filter column vector, $w_{l+1}$ designates the next state filter vector, $u_l$ designates the input regression row vector, and $\mu$ designates the step size of the algorithm. The update vector is normalized by the input regression vector energy to be a Griffith counter part of normalized least mean square error (NLMS).

$$w_{l+1} = w_l + \frac{\mu(\sigma_d^2 w_{Rake} - u_l^H u_l w_l)}{\|u_l\|^2} \tag{1}$$

Thus, during the inactive phase, input and output values of the first equaliser 215 are supplied to the first updating unit 280 in order to be processed based on the above Griffith algorithm to apply an adaptive weight update mechanism to the first equaliser 215.

The non-dashed continuous lines and blocks are used during the active phase when the user is assigned at least one channel. The new update algorithm (considering a software implementation for a digital signal processor or vector processor) or architecture (considering a hardware context) is arranged to route received discrete time samples y[l] to two branches, a filtering branch (upper branch) and an adaptation branch (lower branch). The signal samples are routed to the adaptation branch via a delay function or element 290 where the signal samples are delayed by e.g. 16 chips, which corresponds to one HSDSCH symbol period. The short symbol duration of 16 chips is small compared to the relatively large typical coherence times in wireless channels. Thereby, the fact can be exploited that the channel and hence the associated optimal equaliser weights do not change much during this short period of 16 chips.

The proposed phase-dependent switching or selection may be implemented by a switching or selection function or unit (not shown) in response to a control information, e.g. flag or the like, which indicates the prevailing phase (active phase or inactive phase). In a hardware implementation, this switching or selection unit may be an analog or digital electronic switch or selector. In a software-based implementation, the switching or selection function may be achieved by a conditional branch or jump operation in a software routine.

The upper branch corresponds to the typical data flow path in any receiver that has a structure of chip level filtering followed by de-scrambling and spreading, as shown in FIG. 1. Initially, filter weights h[l] are provided by an external filter setting mechanism 210. A Fast Walsh Hadamard Transformation (FWHT) is provided for efficiently implementing multiple de-spreading operations. If M codes are de-spread at a spreading level N, using FWHT instead of M independent correlators decreases complexity from M·N units to $N\log_2(N)$ units. Thus, as long as $M>\log_2(N)$, FWHT remains advantageous. The crossover M value for SF=16 is $\log_2(16)=4$. Hence, in order to jointly de-spread several HSDPA channels corresponding to both the user of interest and other users a FWHT of length 16 can be used, which naturally has 16 outputs. In the following, this type of FWHT is referred to as "FWHT-16".

As can be gathered from FIG. 6, the signal samples output from the first equaliser 215 in the filtering branch are de-scrambled by a de-scrambling function or unit 220 and then supplied to a de-spreading function or unit 230 where FWHT-16 is applied. FWHT-16 outputs which are associated with respective HSDSCHs of the user of interest are passed through decision blocks (slicers) and fed forward to decoder units, such as the decoder 170 of FIG. 1, or other bit level processing units.

However, all hard-detected HSDSCH symbols (e.g. from quadrature phase shift keying (QPSK) or 16-quadrature amplitude modulation (16-QAM) constellations) are also fed back to the lower adaptation branch together with hard-detected or hard-decided HSDSCH symbols of other users provided their channelization codes are also known. Even if they are not known, it is easy to detect them since the code search space is only limited to at most 14 codes (since at most one code is assigned to user of interest and there can be at most 15 codes assigned to HSDPA service). Furthermore the HSD-SCH codes are placed consecutively (which makes detection an easier task) and the constellation is also limited to QPSK and 16-QAM, which is also easy to detect. Therefore with little effort one can also exploit other possibly existing HSDPA codes.

The symbol estimates fed back to the lower branch are however not limited to only HSDPA codes. Rather, all other FWHT-16 outputs are supplied to a non-linear filtering function or unit 240 where they are supplied to a non-linear filtering, e.g. they are blocked or allowed by LMMSE scaling in the non-linear filtering block, which controls feedback to the adaptation branch. The estimated or detected symbols fed back to the adaptation branch are then first re-spread in a spreading unit 260 according to the FWHT-16 algorithm and then re-scrambled in a scrambling unit 250 to obtain a desired signal which can be used as a kind of training sequence or desired signal.

The difference between this desired signal d[l] and the output of a second equaliser 255 to which the delayed input signal samples u[l] are supplied is provided as an error signal e[l] to a second updating unit 270 which performs weight updating for the second equaliser 255. The updated weights of the second equaliser 255 can then be directly used as weights for the first equaliser 215 in the upper filtering branch.

The feedback of the hard-detected HSDPA symbols and linearly estimated other active symbols provides the advantage that the base station synchronous transmitted total chip level signal can be estimated as precisely as possible and used as a training sequence for the second equaliser 255 residing in the lower adaptation branch. In particular, the second equaliser 255 operates on a delayed form of the received signal samples, which are delayed by one HSDPA symbol period. Therefore, the signal detected or estimated (in case of a linear feedback portion) serves as a perfectly synchronized chip level desired response for the lower adaptation branch in the following symbol period. Although the data flowing through the upper filtering branch is one symbol period ahead of the data flowing through the adaptation branch, the equaliser weights adapted at the second equaliser 255 of the adaptation branch can safely be used to filter the actual data of the upper filtering branch. This is feasible due to the fact that one HSDPA symbol period (i.e. 16 chips) is almost a negligible time compared to the coherence time of typical wireless channels.

FIG. 7 shows schematic diagrams indicating non-linear filter operations applied in specific categories of the output samples of the FWHT-16 processing at the de-spreading unit 230. In particular, the non-linear filtering unit 240 categorizes the sample outputs into HSDSCH branches which are hard-detected as shown in the middle processing flow of FIG. 7. The HSDSCH branches are supposed to carry the most reliable desired signal estimates. This is actually the case as long as correct decisions are done most of the time and HSDSCH symbol amplitudes are estimated precisely. The amplitude estimation can be based on the power offset value between the HSDSCHs and the control pilot channel CPICH signaled by the base station, i.e. Node B.

Figure 2:
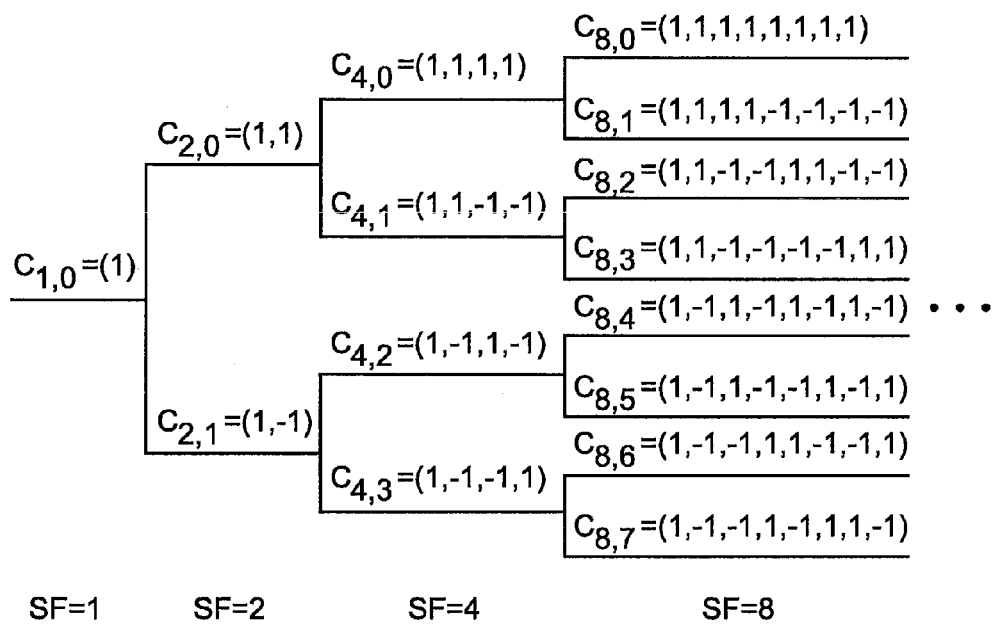
FIG. 2 shows a graphical representation of an orthogonal variable spreading factor (OVSF) tree.
Figure 3:
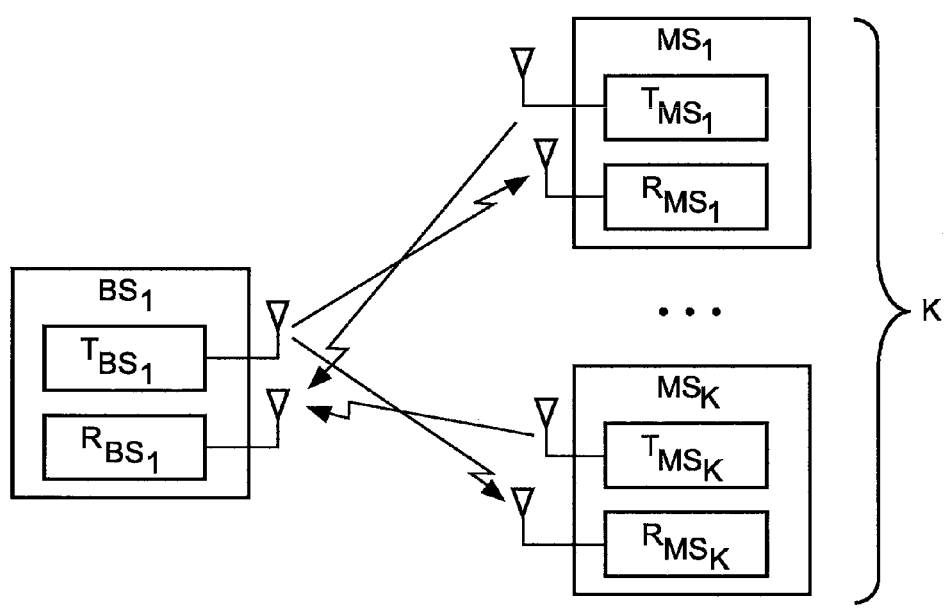
FIG. 3 shows a typical structure of a multi-user communications system.
Figure 4:
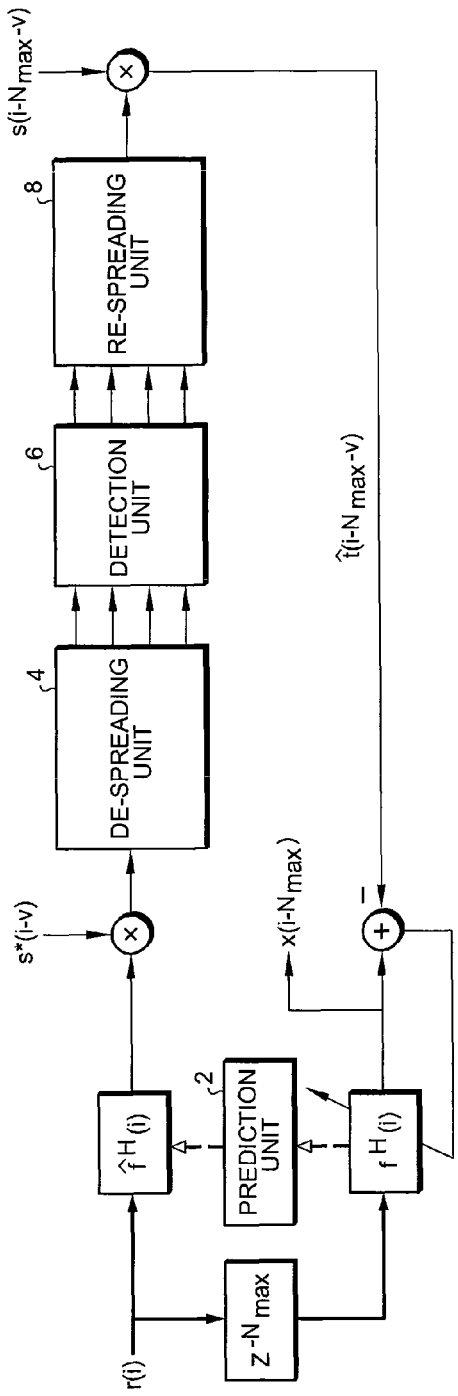
FIG. 4 shows a schematic block diagram of a decision-directed chip rate adaptive equaliser according to the prior art.

Furthermore, a first-output branch corresponds to the first output, i.e. the output from effective de-spreading with all-ones code, which partially de-spreads the CPICH tone, PCCPCH code and all active codes under the OVSF subtree rooted from code $c_{16,0}$ of the OVSF tree of FIG. 2. Two options are possible here. According to the first option, this first-output branch is excluded from the feedback operation and instead the CPICH chip sequence is added, since this sequence is a known constant sequence. However, this approach has the drawbacks of a need to also estimate the CPICH amplitude, and the fact that other code under the OVSF sub-tree rooted from code $c_{16,0}$ cannot be included once CPICH is explicitly fed back. According to the second option, the first-output branch is fed back without doing any processing on it, as shown in the upper flow of FIG. 7, or fed back scaled by LMMSE weighting.

For the remaining other branches OB, the treatment is selected to be totally blind. It cannot be a priori known if there is considerable activity over the OVSF sub-trees rooted from each of them. The trick is that active generalization (spreading) codes do not need to be known and their actual symbols do not need to be estimated as long as hard decisions or other non-linear operations which definitely require constellation and symbol amplitude information are not considered. It is equally sufficient to get pseudo-symbol estimates reflected from an actual symbol residing at a particular place in the OVSF hierarchy to any of its parent code or child codes. Therefore, the other branches OB can be processed by first estimating an energy threshold $\sigma_{th}^2$ and then compare the energy at those other branches OB with this threshold, as indicated in the diagram of the lower processing flow of FIG. 7. Those branches that are above this energy threshold $\sigma_{th}^2$ pass the non-linear filtering unit 240 and are fed back, while others are blocked.

It is stressed here that it is not much useful to correctly detect all the activity under any branch. Instead, it is sufficient to determine whether it would be advantageous to include or exclude any particular branch. For example, there might be weak activity under some branches but the interference and noise captured by that FWHT-16 branch can be much more dominant. In such a case, it is better to block this branch.

As an optional improvement mechanism, an LMMSE weighting mechanism may also be introduced in the non-linear filtering unit 240 or a separate unit, which is performed after hard-detection and non-linear processing among all the passing or feedback branches based on their reliability measure, e.g. their SINR values.

This feedback strategy improves energy of the desired signal and allows for better tracking of the channel. Moreover, this recursive process can be interpreted as a learning process also for the desired signal. With each recursion, the quality of filter weights and thus the detected or estimated feedback signal (i.e. the desired signal) is improved.

Updating of the filter taps or weights at the second updating unit 270 can be done as chip rate or even at an updating rate lower than the chip rate, so that complexity can be reduced. Update rule implemented in the second updating unit 270 can be a recursive equation used to update the filter taps under a DD-LMS algorithm as proposed in the initially mentioned prior art of Schniter et al., wherein $\mu$ is the step size of the algorithm.

In view of the fact that de-spreading in the de-spreading unit 230 is done jointly at a single level, i.e. SF=16. Therefore, in the example of FWHT-16 operation, de-spreading complexity can be decreased by a factor 4. Compared to other methods, computational complexity is even much less. The number of codes is dramatically decreased due to the fact that several active codes at higher spreading factors in the OVSF and as a single pseudo-code at spreading factor SF=16. Additionally, the mixture of hard and weighted linear decisions and optional explicit reliability measures leads to an increased efficiency of the proposed scheme.

The very initialization of the scheme by the external weight setting mechanism 210 can be based on a conventional Rake principle. Thereafter, the Griffith algorithm or another suitable algorithm can be used during inactive phases.

Any DD scheme is prone to misconvergence problem. This is a phenomenon which occurs when the equaliser locks to a rotated constellation (state) and cannot recover from there. In order to avoid misconvergence, the PCPICH signal can be utilized, which is a 45 degree vector at both chip and symbol level after descrambling. First, a Super-PCPICH-Symbol (sum of a block of PCPICH-symbols) is obtained every 5 or 10 PCPICH symbol periods which is a Doppler-spread and noise dependent design parameter and can be less or more) and the equaliser filter weights are de-rotated by an angle which is equal to the difference between the phase of the estimated Super-PCPICH Symbol and 45 degrees, which is the correct phase for the pilot signal.

Complexity of adaptive LMS filtering is based on the components of adaptation and filtering. Both have almost the same complexity, i.e. approximately four times the number of taps or weights, real multiplications and additions. The DD algorithm used in the second updating unit 270 requires two filtering and one adaptation mechanism. Therefore, when adapted at chip rate the DD updating scheme is 50% more complex than the adaptive LMS filtering. However, when the adaptation rate is decreased by a factor of $\chi$, then the adaptation part complexity of the LMS algorithm and the one filtering part and adaptation part complexities of the DD-LMS algorithm decrease proportionally. This can be expressed by the following equation (2):

$$\frac{DD - LMS_{complexity}}{LMS_{complexity}} = \frac{1 + 2/\chi}{1 + 1/\chi} = \frac{\chi + 2}{\chi + 1} \quad (2)$$

Thus, when the filters are adapted at HSDSCH symbol rate, for example, the complexity increase with respect to the LMS algorithm can be reduced to only 6%. The additional re-spreading unit 260 and re-scrambling unit 250 add a negligible amount of complexity with respect to the filtering operation.

The proposed equalisation scheme reduces the effect of interference power, so that the power of the desired feedback signal d[l] is much better than in conventional solutions, since the non-linear filtering unit 240 serves to exploit all available power. Compared to conventional NLMS algorithms, where adaptation of the filter taps or weights using only the pilot tone does not work because the power given to them is too small compared to the interference level, remarkable gains can be achieved. The required complexity increase can be reduced and also tuned, since it depends on the rate of adaptation.

Figure 8:
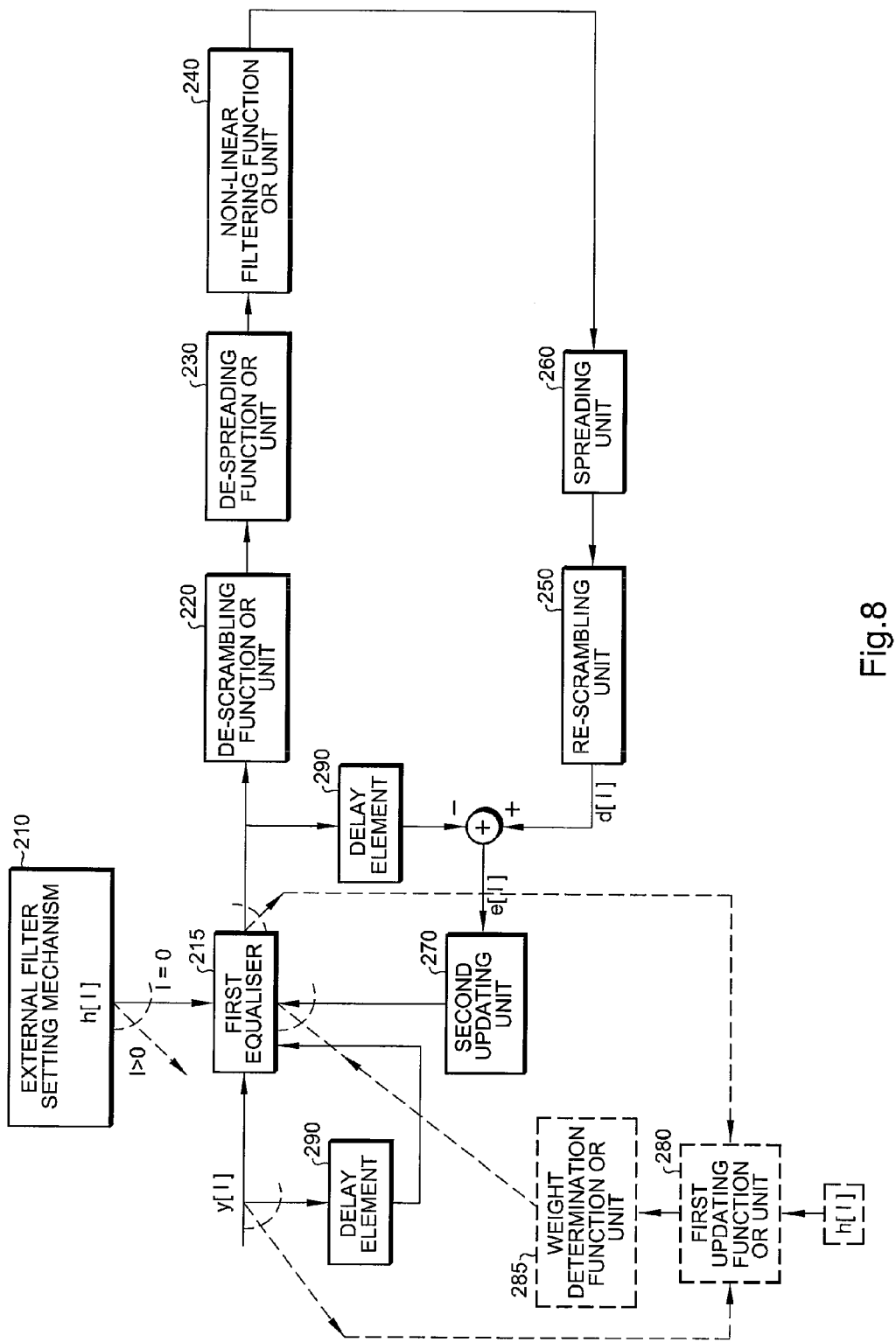
FIG. 8 shows a block diagram of an equaliser architecture according to a second preferred embodiment.

FIG. 8 shows a schematic block diagram of an alternative hybrid equaliser architecture according to the second preferred embodiment. The principle is similar to the first preferred embodiment. Therefore, only those blocks will be described in the following, which are new or which function or operation is changed in the second preferred embodiment. The function and operation of the remaining blocks are similar to the first preferred embodiment and are not explained again here. Moreover, the features of the first preferred embodiment described above in connection with FIG. 7 may also be applied to the following second preferred embodiment.

The following architectural change is introduced in the DD-LMS of the second preferred embodiment, which decreases the adaptation complexity by 50% and overall complexity by 33%.

In the first preferred embodiment as shown in FIG. 6, the input signal y[l] is delayed by 16 chips in the delay element 290, i.e., by one HSDPA symbol, and fed forward to the lower adaptation branch as the signal u[l]. The upper data-filtering branch estimates the user symbols. It is composed of filtering in the first equaliser 215, descrambling in the descrambling unit 220, despreading in the despreading unit 230 by all the pseudo-codes at spreading factor level 16 via FWHT and finally hard decisions on HSDPA codes and LMMSE weightings on the other codes in the non-linear filtering unit 240. The estimated symbols are fed back to the lower branch passing through FWHT in the re-spreading unit 260 and re-scrambling in the re-scrambling unit 250. The resultant BS chip estimate d[l] serves as the desired response for adaptation of the second equaliser 255. The incurred delay is 16 chips plus a little processing delay at units 260 and 250 (which can be done at the high processor speed and does not have to be done at chip rate), which is much smaller than typical coherence time of mobile channels. Therefore, the estimated filter weights of the second equaliser 255 can directly be used in the first equaliser 215 of the data filtering branch.

The major complexity of the whole architecture of the first preferred embodiment of FIG. 6 results from the two filter functions of the first and second equalisers 215, 255. In the second equaliser 255 both chip rate filtering and adaptation processing is done. In the first equaliser 215 only filtering is done since the second equaliser 255 readily provides the weights. Both operations have O(N) complexity where N is the number of FIR filter taps. Therefore the two blocks 215 and 255 incur in total 3 units of computational complexity.

In the second preferred embodiment of FIG. 8, also the output signal of the first equaliser 215 is delayed by a second delay element 290 by the same amount of delay (i.e., one symbol period) at the upper-branch. The delayed output signal of the first equaliser 215 is subtracted or compared to the re-scrambled feedback signal obtained from the re-scrambling unit 250, and the resultant error signal e[l] is supplied to the second updating unit 270 which now directly feeds the first equaliser 215. Additionally, the delayed input signal u[l] obtained from the first delay element 290 is supplied to first equaliser 215. Thereby, the first equaliser 215 at the upper branch can be adapted without needing the second filter 255 in the lower branch. Consequently, the adaptation process is moved from the second equaliser 255 to the first equaliser 215, and the second equaliser 255 can be deleted. The resulting architectural change is shown in FIG. 8. The remaining architecture of the second preferred embodiment, i.e., the symbol estimation processes etc., is the same as in the first preferred embodiment.

With this architectural change of the second preferred embodiment, the adaptation overhead can be decreased by 50% (from two units to one unit) and the overall complexity can be decreased by 33% (from three units to two units). Furthermore, this also enables proportional amount of power saving.

It should be understood that the functions or blocks of FIGS. 6 and 8 can be implemented with discrete circuit elements, or as software routines which are executed by a suitable data processor. A combination of circuit elements and software routines may also be employed. Also, other weight updating algorithms which provide an adaptive complex chip estimation filter may be used.

It is to be noted that the two aspects of the present invention, namely phase-dependent selection of different updating architectures or algorithms on one hand and the new variant of the DD-LMS equaliser on the other hand, can be implemented in separate embodiments. That is, the dashed blocks in FIGS. 6 and 8 can be considered optional and the remaining new variant of the DD-LMS equaliser architecture or algorithm corresponding to the non-dashed blocks in FIGS. 6 and 8 may be provided without phase dependent switching or selection. Additionally, the hybrid equaliser architecture with phase-dependent switching or selection between different equaliser architectures or updating algorithms may be implemented without the new variant of the DD-LMS equaliser. Instead, switching or selection may be performed between two known equaliser architectures or updating algorithms, e.g., Griffith algorithm and conventional DD-LMS algorithm disclosed in the above prior art of Schniter et al.

In summary, a receiver apparatus and method of controlling weight adaptation in a receiver of a code multiplex telecommunications system with orthogonal spreading codes have been described, wherein received discrete time signal samples are chip-level filtered by using a first equalising step. Additionally, the received discrete time signal samples are delayed by a time period corresponding to a data symbol and used in a second equalising step. Symbol estimates obtained from the first equalising step are non-linearly filtered and used as a desired response for the second equalising step in the following symbol period, wherein equaliser weights adapted in the second equalising step are used for the first equalising step. Alternatively, the second equalising step may be dispensed with and weight adaptation may be incorporated in a single equalising step. As an additional or alternative option, a hybrid equaliser architecture may be provided, where the above two-step equalisation is used during an active phase where a channel is allocated, while another weight updating scheme is used during an inactive phase where no channel is assigned. Thereby, detrimental effects of interference power can be reduced at low increase in complexity.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A receiver apparatus for use in a code multiplex telecommunications system with orthogonal spreading codes, said receiver apparatus comprising:
    a filtering branch with first equaliser means for receiving discrete time signal samples and for chip-level filtering said received signal samples;
    feedback means for performing a non-linear blind filtering of symbol estimates obtained in said filtering branch and feeding the filtered symbol estimates back to the first equaliser means, said feedback means comprising a despreading unit performing multiple despreading operations at only a single spreading level N, said blind filtering providing N pseudo-symbols estimates reflected from an actual symbol residing at a particular place in an OVSF hierarchy to any of its parent code or child codes;
    adaptation means for receiving said received signal samples via a delay means arranged for delaying said received signal samples by a time period corresponding to said pseudo symbol; and
    wherein said filtered symbol estimates are used by the adaptation means as desired response for adapting equaliser weights of the first equaliser means in the following symbol period.

2. A receiver apparatus as claimed in claim 1, wherein the first equaliser means comprises the adaptation means.

3. An apparatus according to claim 2, further comprising subtracting means for obtaining a difference between filtered signal samples, output from said equaliser means and delayed via another delay means arranged for delaying said filtered signal samples by a time period corresponding to a data symbol, and feedback signal samples obtained from said feedback means, and for supplying said difference to updating means for adapting said equaliser weights of said equaliser means.

4. An apparatus according to claim 1, wherein said time period corresponds to a fixed symbol length of said orthogonal spreading codes.

5. An apparatus according to claim 1, wherein said filtering branch comprises de-spreading means for de-spreading de-scrambled and equalized signal samples at a single code tree level, and wherein de-spread signal samples are supplied to said feedback means.

6. An apparatus according to claim 5, wherein said filtered symbol estimates fed back by said feedback means are spread again in a spreading means.

7. An apparatus according to claim 6, further comprising selecting means for selecting other weight updating means during an inactive phase in which no channel code is assigned to said receiver apparatus.

8. An apparatus according to claim 1, wherein said other weight updating means are arranged to operate based on a direct comparison of an input and output of said first equaliser means.

9. An apparatus according to claim 1, wherein said other weight updating means are arranged to operate based on the Griffith algorithm.

10. An apparatus according to claim 9, wherein said feedback means are arranged to categorize said symbol estimates obtained in said filtering branch into a first branch group of downlink shared channels supposed to carry most reliable estimates which are to be hard-detected, a second branch group of first outputs to be excluded from feedback and to be replaced by a known constant sequence, or to be fed back without any processing, and a third branch group of remaining branches to be blocked below a predetermined threshold.

11. An apparatus according to claim 10, wherein said predetermined threshold corresponds to an average energy level between hard-detected and soft-detected values of the all downlink shared channels.

12. An apparatus according to claim 11, wherein said feedback means is arranged to apply a weighting mechanism after said non-linear filtering, said weighting mechanism being based on a reliability measure.

13. An apparatus according to claim 12, wherein said reliability measure is a measure of a signal-to-interference-plus-noise ratio.

14. A method of controlling weight adaptation in a receiver of a code multiplex telecommunications system with orthogonal spreading codes, said method comprising the steps of:

receiving discrete time signal samples and chip-level filtering said received signal samples by using a first equalising step;

delaying said received discrete time signal samples by a time period corresponding to a data symbol and using said delayed time signal samples in an adaptation function for said first equalising step;

applying a non-linear blind filtering operation to symbol estimates obtained from said first equalising step and using the filtered symbol estimates as a desired response for said adaptation function for adapting equaliser weights for said first equalizing step in the following symbol period, said blind filtering performing multiple despreading operations at only a single spreading level N for the purpose of providing N pseudo-symbol estimates reflected from an actual symbol residing at a particular place in an OVSF hierarchy to any of its parent code or child codes.

* * * * *